United States Patent [19]
Cresswell et al.

[11] Patent Number: 5,324,904
[45] Date of Patent: Jun. 28, 1994

[54] REACTORS FOR EFFECTING CHEMICAL PROCESSES

[75] Inventors: David L. Cresswell, Christleton; Eric W. Sims, Widnes; Ralph J. Doy, Saltburn, all of England

[73] Assignee: Imperial Chemical Industries PLC, London, England

[21] Appl. No.: 902,441

[22] Filed: Jun. 9, 1992

Related U.S. Application Data

[63] Continuation of Ser. No. 416,302, Oct. 3, 1989, abandoned.

[30] Foreign Application Priority Data

Oct. 3, 1988 [GB] United Kingdom ............... 8823182.4

[51] Int. Cl.$^5$ ............................................. H05B 6/64
[52] U.S. Cl. ................................... 219/635; 219/618; 219/628
[58] Field of Search ............. 219/10.57, 10.491, 10.51, 219/10.65

[56] References Cited

U.S. PATENT DOCUMENTS

| | | | |
|---|---|---|---|
| 1,273,389 | 7/1918 | Luderck | 219/10.51 |
| 1,515,729 | 11/1924 | Clement | 219/10.51 |
| 1,981,632 | 11/1934 | Northrop | 219/10.57 |
| 2,226,446 | 12/1940 | Smith | 219/10.51 |
| 3,826,895 | 7/1974 | Schladitz | 392/488 |
| 3,934,117 | 1/1976 | Schladitz | 392/488 |
| 4,089,176 | 5/1978 | Ashe | 219/10.51 |
| 4,145,591 | 3/1979 | Takeda | 219/10.51 |
| 4,855,552 | 8/1989 | Marceau | 219/10.51 |

FOREIGN PATENT DOCUMENTS

| | | |
|---|---|---|
| 1182421 | 2/1970 | United Kingdom . |
| 1325675 | 8/1973 | United Kingdom . |
| 1593473 | 7/1981 | United Kingdom . |

*Primary Examiner*—Bruce A. Reynolds
*Assistant Examiner*—Tu Hoang
*Attorney, Agent, or Firm*—Cushman, Darby & Cushman

[57] ABSTRACT

An inductively heatable reactor for effecting fluid phase chemical processes. The reactor comprises an inductively heatable, fluid permeable reactor element having at least one solid block in which is provided a plurality of fluid conveying ducts which extend through the reactor element in a substantially parallel arrangement from one end face thereof to the other.

8 Claims, 3 Drawing Sheets

REACTORS FOR EFFECTING CHEMICAL PROCESSES

This is a continuation of application Ser. No. 07/416,302, filed on Oct. 3, 1989, which was abandoned upon the filing hereof.

BACKGROUND OF THE INVENTION

1. Field of the Invention

The present invention relates t inductively heatable reactors suitable for implementing fluid phase reaction processes.

2. Description of Related Art

Various reactor designs are known. It is known, for example, to carry out reaction processes by passing fluid phase reactants through a furnace-heated reactor tube. However, such a reactor provides adiabatic reaction conditions therein and a relatively long reaction time. Consequently, the reactions tend to suffer from the disadvantage of a lack of selectivity towards product formation, and by-products are often formed by competing reactions.

In GB Patents 1182421 and 1325675 fluid heaters having as their essential feature a porous, fluid-permeable, electrical resistance heater element, which can be in the form of a hollow cylindrical body, are described. The heater elements described therein are heated by direct current and arranged so that the fluid to be heated passes through the element from an entry side thereof to an exit side, the hot exit fluid being cooled after it emerges from the element. One drawback of the direct current heating used in the heaters of GB Patents 1182421 and 1325675 (said also to be usable as reactors) is that there may be heat losses due to thermal conduction by way of the leads carrying the current. Additionally, the finely porous nature of the reactor elements would be liable to cause them to foul with reaction products and carbon deposits after relatively short periods of use.

The use of fluid-permeable heater elements that are heated indirectly by electrical induction has been reported in U.S. Pat. Nos. 4,091,021 and 3,826,895, and in GB Patent 1593473. The thermal heater elements described in the two U.S. Patents consist of a felted plug or packing of randomly oriented, electrically conducting fibres (metallised at their points of contact to improve electrical conductivity) which fill most the length of a tube (in the case of U.S. Pat. No. 3,826,895, a plurality of such elements being connected in series); the element of GB 1593473 is of a different design and comprises a packing of touching small metal spheres in a tube. The design and large thickness of the inductively heatable reactor elements described in the aforementioned patents would be unlikely to allow fluid residence times of the order of milliseconds or the substantially uniform thermal treatment of each and every part of the fluid flowing through them. Furthermore, the metallic connections would be subject to chemical attack in an acidic atmosphere at an elevated temperature.

In U.S. Pat. No. 3,428,695 there is described a fluid phase reaction process which is carried out by continuously passing a stream of reactants through an elongated tube. The use of an inductively heated graphite tube reactor (32.5 cms (13") long, internal diameter 0.31 cms ($\frac{1}{8}$"), outer diameter 1.25 cms ($\frac{1}{2}$")) centred within a high silica glass tube is specifically described in this U.S. patent, the inductive heating being effected by means of a copper coil supplied with power from a high frequency generator operating at 450 kilocycles. The tubular reactor described in this patent is said to allow short reactor times to be employed. However, such a reactor design is thought to incur a fairly broad reaction time distribution, even if short reaction times are employed, which can lead to a decreased selectivity for the desired reaction product(s) and the formation of unwanted by-products. Furthermore, single bore tubular reactor elements tend to exhibit poor heat transfer characteristics since the surface area of the walls enclosing the reaction zone is small compared to the volume of the reaction zone. Consequently, the uniform thermal treatment of all the fluid reactants passing through the reactor element may be unattainable. Furthermore, the tubular reactor element of U.S. Pat. No. 3,428,695 is not particularly amenable to scale-up, since the problems associated with having a single large hole passing through the reactor element will be accentuated as the dimensions of the reactor element are increased.

SUMMARY OF THE INVENTION

We have now devised an inductively heatable reactor which is capable of providing high heat transfer characteristics, short reaction times and an isothermal reaction zone, such that approximately uniform temperatures are applied to each and every part of the fluid passing through the reaction zone. The reactor comprises a reactor element having a plurality of fluid conveying ducts which tends to be less susceptible to fouling than the porous elements hereinbefore described in relation to GB Patents 118,2421 and 1325675. Furthermore, the design of the reactor element is such that it can provide for the efficient use of the electrical energy which is used for the induction heating thereof.

Therefore, according to the present invention there is provided a fluid phase inductively heatable reactor comprising:

(a) an inductively heatable, fluid permeable reactor element comprising at least one solid block in which is provided a plurality of fluid conveying ducts, said ducts extending along the reactor element in a substantially parallel arrangement so that fluid may pass through the reactor element from one end face thereof to the other;

(b) heating means for heating the reactor element by electromagnetic induction;

(c) entry conveyance means for conveying a flow of fluid to be reacted to the entry side of the reactor element for passage therethrough; and (d) exit conveyance means for conveying exit fluid away from the reactor element.

In a preferred embodiment, substantially all, e.g. all, of the fluid conveying ducts extending along the reactor element are arranged in one or more groups such that each duct in a group is located in a region of the reactor element that will receive substantially uniform inductive heating.

In a particularly preferred embodiment, the reactor element comprises at least one solid cylindrical block in which is provided a plurality of fluid conveying ducts, said ducts being arranged substantially parallel to the longitudinal axis of the reactor element, so that a flow of fluid may pass longitudinally through the reactor element (via the ducts) from one end face thereof to the other, wherein substantially all, e.g. all, of said ducts are arranged around the longitudinal axis in one or more annuli such that each duct in a given annulus is equidistantly spaced from said axis.

The reactor element may be of any suitable size appropriate to the scale of the reaction process that is required, so that reactor elements of almost any dimensions are practicable up to very large reactor elements capable of being employed on plant scale industrial reactors. For example, the dimensions of a cylindrical reactor element may range from 20 cms to 400 cms in length and form 10 cms to 200 cms in diameter where plant scale operation is required.

The ducts which pass through the reactor element are preferably circular in cross-section and will typically have a diameter in the range 2 to 12 mm, larger ducts in this range being more commonly employed in larger reactor elements. Reactor elements in which the fluid conveying ducts have a uniform diameter are particularly preferred. The length of the ducts will, of course, depend on the length of the reactor element, which as a rule increases with increasing reactor element capacity. The number of ducts will largely depend on the size of the reactor element. The reactor element will typically comprise from 2 to 1000, and more typically from 50 to 500 fluid conveying ducts. These ducts are preferably made by drilling into a solid block of material.

It may be advantageous to assemble the reactor element form a number of shorter blocks each provided with a substantially parallel arrangement of fluid conveying ducts extending form one end face thereof to the other. The individual blocks can then be assembled in end to end relation to provide a full length reactor element in which each block forms a sealing engagement with its neighbours. The engagement between each pair of blocks must be a sealing engagement so as to prevent the escape of fluids from the reactor element.

In preferred embodiments, the blocks are assembled in abutting end to end relation (i.e. an end face of one block abuts an end face of a neighbouring block). Preferably the abutting end faces of the blocks are provided with inter-engaging lugs and sockets to key the blocks together, biassing means, such as a compression spring, exerting a force which pushes the blocks firmly together, thereby maintaining the blocks in sealing engagement. Where the biassing means is a compression spring, it will normally act on one end of the reactor element, with the other end of the reactor element being rigidly held. The lugs may be provided with bevelled surfaces to assist the formation of a sealing engagement between the blocks.

The compression spring is preferably thermally insulated form the reactor element by means of a non-inductively heated dead block which is arranged on the end of the reactor element in sealing engagement therewith, so that the compression spring acts on the reactor element indirectly through the dead block. The dead block will be in fluid flow communication with the reactor element allowing fluids to pass from one to the other. The engagement between the dead block and the reactor element may be such as to provide an inner void which assists in preventing the back-flow of heat from the reactor element to the dead block.

In one embodiment, each block is provided with an identical arrangement of fluid conveying ducts, the blocks being assembled in abutting end to end relation, such that the ducts in one block are aligned with the ducts in the neighbouring block at each end. Where the reactor element is built up from a number of shorter blocks, the diameter of the ducts may (if desired) be varied along their length, for example, their diameter may be gradually increased form the entrance side of the reactor element to the exit side thereof.

Alternatively, where the reactor element is assembled form a number of shorter blocks, the engagement between any two blocks may be arranged and adapted so that an enclosed mixing chamber is provided between the two blocks. In this way the fluids exiting the ducts provided in one block enter the mixing chamber prior to entering the ducts provided in the succeeding block. With such an arrangement the ducts in an engaging pair of blocks need not necessarily align. Where the individual blocks are assembled in abutting end to end relation, such a mixing chamber may be formed by providing the abutting end face of at least one of an engaging pair of blocks with an inner recess, so that when the blocks are assembled the recess provides an enclosed mixing chamber.

Preferably the reactor element is constructed entirely of a solid, non-porous, electrically and thermally conductive material which retains its structural integrity at the high operating temperatures of the reactor element and which is resistant to attack by the reactants and reaction products at the high operating temperatures of the reactor element. Suitable elemental materials may include, inter alia, carbon, graphite, metals such as platinum or nickel, metal alloys such as the nimonic steels, e.g. the Inconels. The preferred reactor element material is graphite.

Alternatively, the body of the reactor element may be constructed from more common electrically and thermally conductive metals having good structural integrity, such as iron or steel, in which the material lining the ducts is also resistant to attack by the reactants and reaction products at the high operating temperature oft he reactor element, such as platinum or the Inconels.

The reactor element is heatable by electromagnetic induction to a temperature normally of at least 500° C., more usually at least 700° C., and typically in the range of from 850° C.–1150° C., though higher reaction temperatures are attainable. The reactor element is capable of providing fluid residence times therein of less than 200 milliseconds, for example, 1 to 100 milliseconds, or within this range 1 to 30 milliseconds. Furthermore, the reactor element is capable of providing a narrow residence time distribution, so that the variation from any preselected optimum residence time for a particular process is minimised. The residence time is a measure of the time spent by the fluid reactants int he reactor element, and is intended to include the time taken in the reactor element for the fluid reactants to warm up from a low entry temperature to the high temperature imparted by the hot element, as well as the time taken for the fluid reactants to react. It will be appreciated that the present reactor element, by virtue of having a plurality of fluid conveying ducts, provides a high surface area for contacting with the fluid reactants and, therefore, good heat transfer characteristics, so that the warm up period will normally be short and the fluid temperature attained can approach that of the hot element.

The heating means for heating the reactor element by electromagnetic induction typically comprises a primary coil (e.g. of copper tubing) in an alternating current circuit, the primary coil surrounding the reactor element which constitutes the secondary coil. This is, of course, particularly convenient for a cylindrical reactor element, where the surrounding primary coil will also be cylindrical but of wider diameter. The induction coils are preferably tubular in construction allowing a cooling fluid such as air or water to be passed internally through the coils to effect cooling thereof. The primary coil may, of course, be separated from the reactor element by a reactor casing and/or other structure or structures of the reactor.

For a cylindrical reactor element the inductive heating is more concentrated in the outer annuli of the element, the degree of heating decreasing towards the centre. This problem is more pronounced with small reactor elements owing to the higher alternating current frequencies that are required for the inductive heating. For example, for a cylindrical reactor element a few centimeters long and a few centimeters in diameter, alternating current frequencies around 500 kilocycles are typically employed to inductively heat the reactor element to the operating temperatures required therein (e.g. in excess of 500° C.)

However, by employing the present reactor element the problem of non-uniform heating leading to a non-isothermal reaction zone may be ameliorated. For example, with the preferred cylindrical reactor element, anisothermal reaction zone may be achieved by arranging the longitudinally extending ducts in a single annulus around the central longitudinal axis such that all the ducts are equidistantly spaced from the axis, and so located in a substantially uniformly heated region of the reactor element. Even for a small cylindrical reactor element comprising, for example, two annuli of ducts, the desired isothermal reaction conditions may be attainable by virtue of the conductivity of the elemental material. For example, the ducts may be arranged in the form of two closely spaced annuli, preferably located towards the outer region of the said reactor element, so that any difference between the extent of heating of each annulus of ducts may be counteracted by the conductivity of the elemental material, which will tend to correct any temperature imbalance.

With somewhat larger cylindrical reactor elements in which the fluid conveying ducts may be arranged in a plurality of annuli, the conductivity of the elemental material may be insufficient to attain an isothermal reaction zone. Nevertheless, such conditions may be achieved, at lest where endothermic reaction processes are concerned, by virtue of the design of the reactor element. For example, with a large cylindrical reactor element the volume of each annulus that is occupied by ducts can be progressively decreased from the outer annulus to the inner annulus. Such an arrangement of ducts may help to create an isothermal reaction zone for an endothermic reaction process carried out using such a reactor element. In a preferred large scale cylindrical reactor element, the longitudinally extending ducts are arranged in a plurality of annuli in which the volume of each annulus that is occupied by ducts progressively decreases from the outer annulus to the inner annulus, and plotted against distance from the central longitudinal axis describes a parabolic function.

Preferably, the volume of each annulus that is occupied by ducts should not exceed 50%; in other words the total volume of ducts in a given annulus should preferably not be greater than half the total volume of that annulus.

For a cylindrical reactor element, by an annulus is meant a notional ring in the radial section, concentric with the radial centre of the element, which extends longitudinally along a length of the reactor element so as to describe a notional cylinder, said annulus including within its boundaries all ducts which are equidistantly spaced from the longitudinal axis passing through the centre of the reactor element.

The use of large scale reactor elements (i.e. up to plant scale) provides a further advantage, since the inductive heating thereof allows the attainment of the high elemental temperatures required using lower alternating current frequencies (e.g. about 50 to 60 cycles per second). accordingly, the inductive heating of large reactor elements allows a more efficient use of the electrical energy input.

It will be realised, that the ducts passing through the cylindrical reactor element of the invention may be located in the regions receiving more intense heating than for an inductively heated tubular reactor element, where the single duct is centrally located therein. Therefore, the present reactor element makes more efficient use of the electrical energy input.

According to a further embodiment of the present invention, the ducts have inserted therein appropriately selected packing elements. By inserting packing elements into the ducts, a narrower residence time distribution may be obtained and, hence, a smaller variation from any preselected optimum residence time which is chosen for a particular process may be achieved. The packing elements, where they ar employed, are constructed out of any material which is both structurally stable and chemically inert at the elevated reaction temperatures employed. Preferably, the material used for the construction of the packing elements should also be thermally and electrically conducting. Suitable materials include graphite, silicon carbide, reticulated carbon (a cylindrical plug of foam like carbon of high porosity), metals and metal alloys such as the Inconels.

Catalytic material may also be included in the reactor element ducts if desired; such material may, for example, be in the form of discrete particles, a surface coating on one or more packing elements and/or on the walls of the ducts, or an impregnant located in the interstices of one or more porous packing elements.

The reactor preferably comprises a fluid impermeable reactor casing arranged around the reactor element, the dimensions of the reactor casing relative to the reactor element being such as to provide an enclosed chamber between the reactor casing and the reactor element. The reactor element is preferably centred within the reactor casing, so that the chamber enclosed by the reactor element and the reactor casing is of uniform width throughout. The centring of the reactor element may be achieved by means of spacers located in the chamber. The spacers may, for example, be of corrugated profile. The reactor casing will normally be constructed of a material which will also be inductively heated during operation of the reactor, so the reactor is preferably provided with means for conveying a cooling fluid through the chamber to cool the reactor casing. Suitable materials for the construction of the reactor casing are metals and metal alloys of the type already discussed for the construction of the reactor element, e.g. the Inconels. In this embodiment the reactor casing serves to provide a further containment for the fluid reactants passing through the reactor in the event that the reactor element or any associated connections linking the reactor element with the fluid entry and exit conveyance means are breached.

In particularly preferred embodiment the fluid reactants are used to cool the reactor casing. In this embodiment the entry conveyance means for conveying the fluid reactants to the entry side of the reactor element is arranged to convey the fluid reactants to the chamber enclosed by the reactor element and the reactor casing, said chamber being in fluid flow communication with the entry side of the reactor element, so that the fluid reactants may pass from the chamber to the entry side of the reactor element. Where the fluid reactants are used to cool the reactor casing, the chamber enclosed by the reactor element and the reactor casing in effect provides a pre-heating zone through which the fluid reactants are passed and heated to a temperature below their reaction temperature prior to entering the reactor element. Baffles may also be arranged to control the flow of fluid reactants as they enter the pre-heating chamber.

The reactor casing may be further cooled by a passive or forced fluid flow passing around the outside thereof. Such a fluid flow, which may, for example, be air or water, can also serve the dual purpose of cooling the induction heating means which is arranged around the reactor casing.

In order to restrict the radiation of heat from the reactor element, it is preferable to lag the reactor element with an insulating material. This is particularly preferred where the reactor is provided with a pre-heating chamber disposed between the reactor element and the reactor casing, since the insulating layer will tend to prevent over-heating of the pre-heating chamber, and control the temperature therein so that the reaction temperature of the fluid reactants is not exceeded. Where the insulating material is of a type that can absorb the fluid reactants, it may be advantageous to cover the insulating layer with a thin layer of a metal of the type already discussed for the construction of the reactor element, e.g. The Inconels. The lagging may also help to prevent the reactor element from over-heating. Suitable insulators include ceramic materials such as alumina and alumina silicate fibres and silica powder.

Where the chamber between the reactor element and the surrounding reactor casing is to be used as a pre-heating zone, a second reactor casing of a non-conducting, insulating material may be disposed around the first reactor casing or the induction heating means and an added safety measure to contain the fluids in the event of a breach in the first reactor casing.

The reactor of the invention may be operated at atmospheric, sub atmospheric, or super atmospheric pressure. However, operating pressures at or near to atmospheric pressure are preferred and, in general, operation at atmospheric pressure, or substantially atmospheric pressure, is found most convenient.

Conventional or obvious entry and exit conveyance means may be used to convey the flow of fluid to and from the reactor element; these normally comprise one or more suitably connected ducts of suitable configuration and position.

A reactor may comprise two or more of the present reactor elements arranged to operate in series, or in parallel. Such an arrangement may, for example, be employed where particularly large scale production is required.

The reactor of the present invention may comprise quench means for cooling the hot exit fluid after it emerges form the reactor element to a lower temperature. Any suitable quench means may be employed. Preferably the quench means comprises jets of an inert (to the exit fluid), cold fluid (usually gas or vapour, although a liquid e.g. water could be used) which are directed to impinge on the hot exit fluid once it has emerged form the reactor element. Quenching fluids like steam, nitrogen or carbon dioxide may be used, steam being preferred. Once the hot exit fluid rom the reactor element has been cooled, it is conveyed away from the reactor.

BRIEF DESCRIPTION OF THE DRAWINGS

The invention is now illustrated with reference to the accompanying drawings in which.

DESCRIPTION OF PREFERRED EMBODIMENTS

Figure 1:
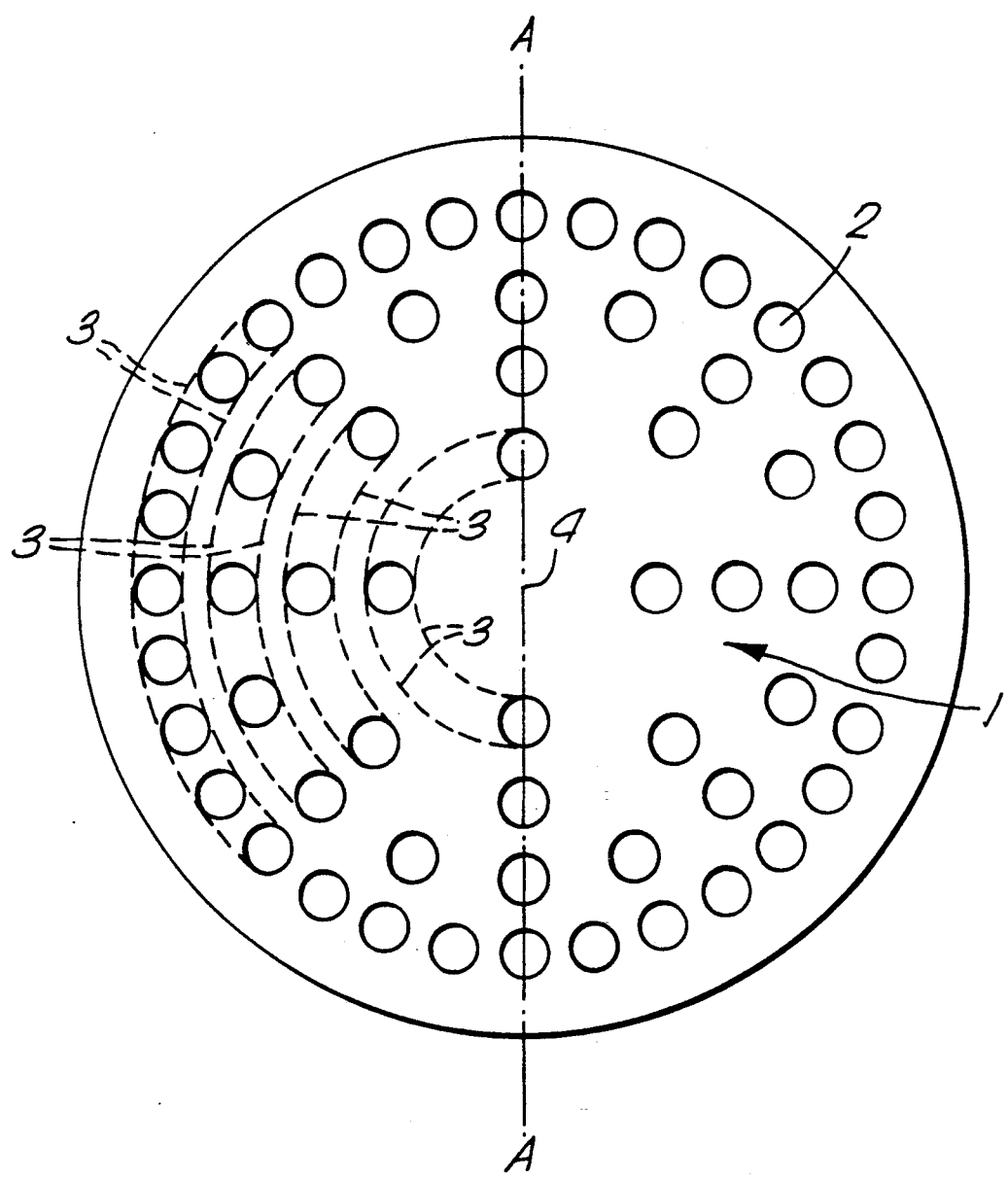
FIG. 1 is a schematic radial section of a cylindrical reactor element.
Figure 2:
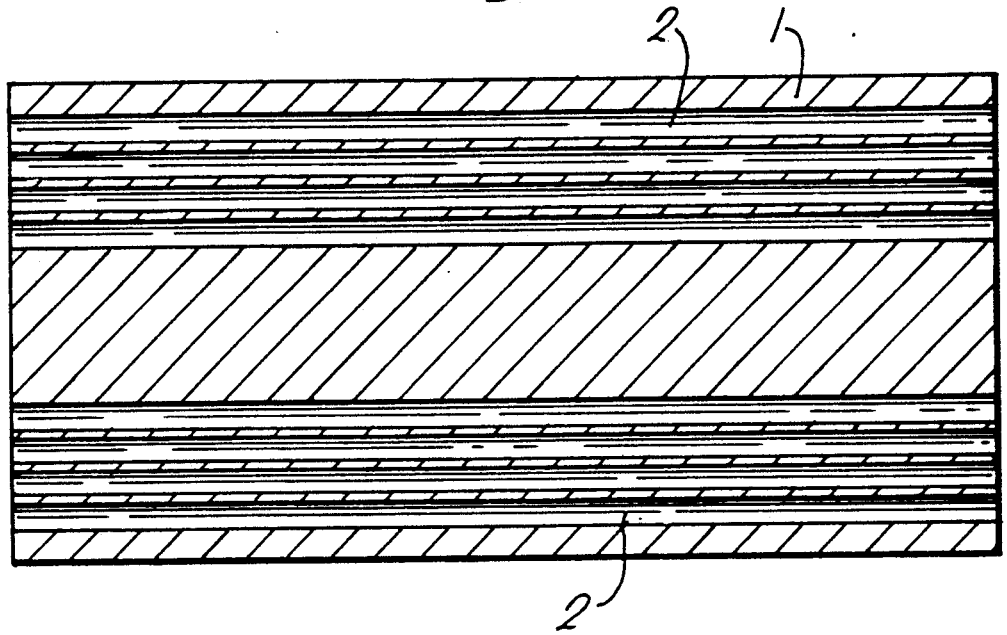
FIG. 2 is a schematic vertical section of the reactor element of FIG. 1 along line A—A drawn to half scale.

Referring to FIGS. 1 and 2, the reactor element has the form of a cylinder (1) having fluid conveying ducts (2) extending parallel to its longitudinal axis from one end face thereof to the other. The ducts are arranged in four radial annuli depicted by means of notional radial lines (3) (see dotted lines on attached drawing) which are concentric with the radial centre (4) of the reactor element. The volume of each annulus that is occupied by ducts decreases form the outer annulus to the inner annulus.

In operation, the fluid reactants conveyed to the reactor element will pass longitudinally through the reactor element (via the ducts (2)) from one end face thereof to the other.

Figure 3:
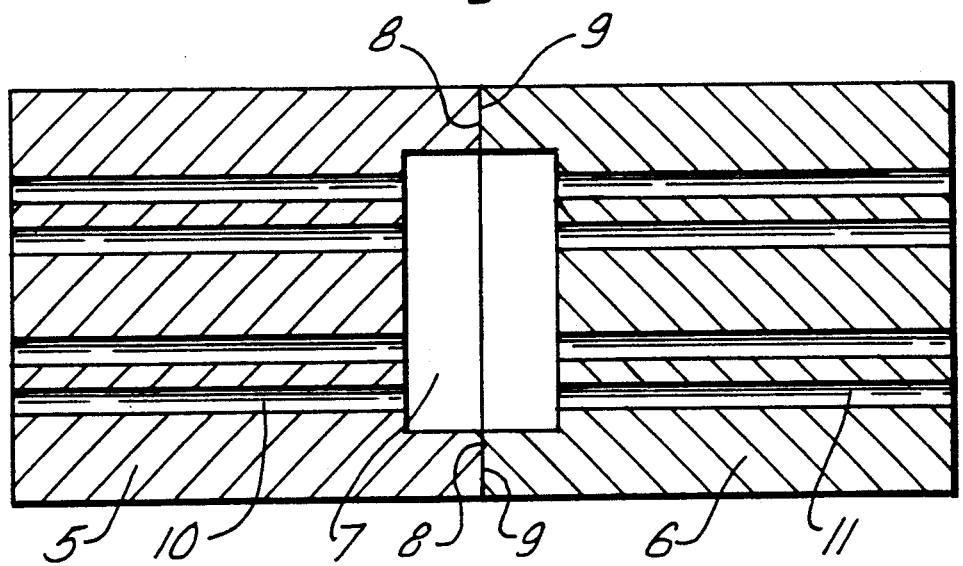
FIG. 3 is a schematic vertical section of a cylindrical reactor element which is built up from two shorter blocks.

Referring to FIG. 3, the reactor element is formed form two shorter blocks (5) and (6) in abutting end to end relation. The reactor element comprises an enclosed mixing chamber (7) which is formed between the two blocks by providing the abutting end faces (8,9) of each block with an inner recess. Each block si provided with a parallel arrangement of longitudinally extending ducts (10,11) which are in fluid flow communication with the mixing chamber.

In operation, the fluid reactants conveyed to the reactor element will pass through the ducts (10) in the first block (5) and will then enter the mixing chamber (7) prior to entering the ducts (11) provided in the second block (6).

Figure 4:
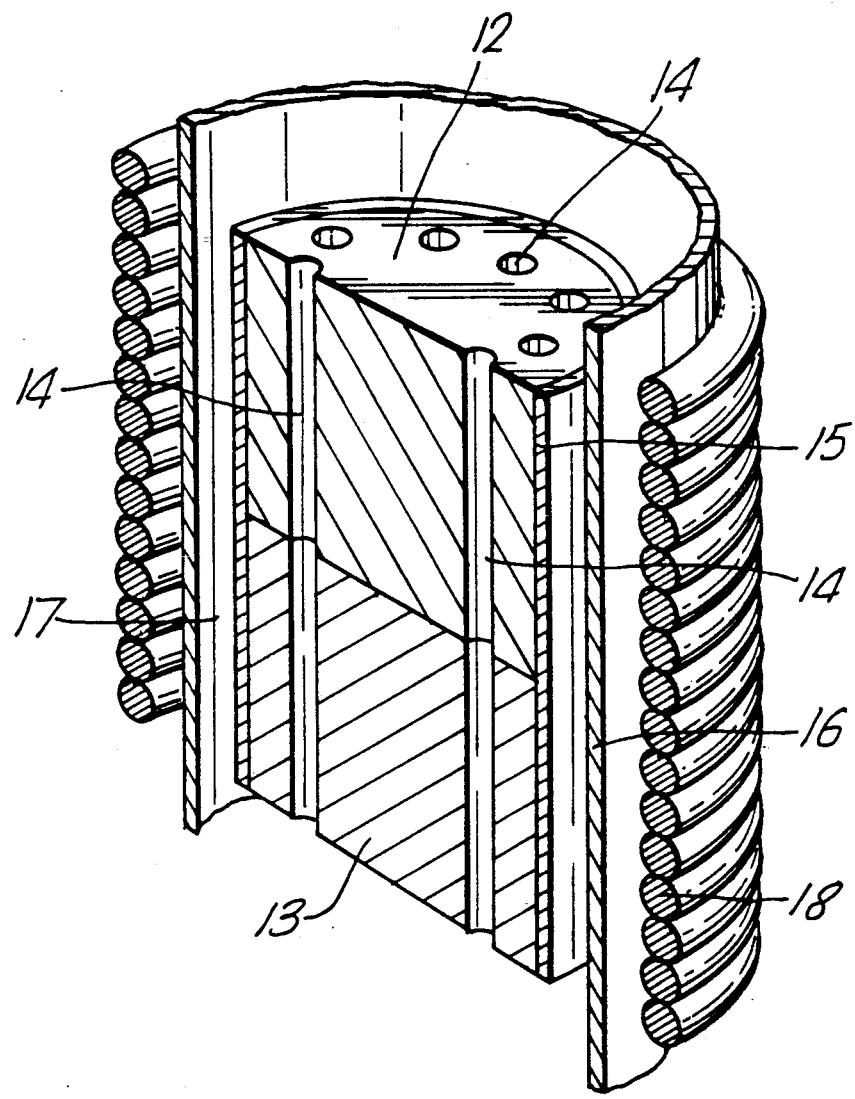
FIG. 4 is a perspective view in section of a reactor of the invention.

Referring to FIG. 4, the reactor comprises a a cylindrical reactor element formed of two blocks (12,13) assembled in abutting end to end relation. Each block comprises a plurality of ducts (14) arranged in an annulus and extending in parallel therethrough. The ducts in one block are aligned with the ducts in the other block, thereby providing a plurality of ducts which extend in parallel through the reactor element from one end face thereof to the other. The reactor element is lagged with a suitable insulating material (15), and is housed in a reactor casing (16). The annular chamber (17) enclosed by the reactor element and the reactor casing provides a pre-heating zone for warming the reactants prior to them entering the reactor element. The induction heating means comprises a plurality of coils (18) arranged around the reactor casing.

The reactor of the invention may be used to carry out a variety of fluid-phase reactions. For example, the high temperature pyrolysis of chlorodifluoromethane (Arcton 22) (optionally in the presence of gaseous diluent) to favourably form as the desired reaction product(s) either tetrafluoroethylene, or hexafluoropropylene, or a mixture of both tetrafluoroethylene and hexafluoropropylene.

I claim:

1. A fluid phase, inductively heatable reactor having an entry side and an exit side comprising:
   (a) an inductively heatable fluid permeable reactor element comprising at least one solid block having i) a central longitudinal axis, ii) an entry face and an exit face perpendicular to said axis at an entry end and at an exit end of said element respectively and iii) a plurality of fluid conveying ducts extending substantially parallel to said axis and arranged in a plurality of annuli around said axis for passing fluid through said element from the entry face to the exit face, each of said annuli having a total volume consisting of a volume of the ducts in an annulus plus a volume of a solid portion of said element between each duct within the annulus, wherein a volume fraction is defined as a ratio of the volume of the ducts of the annulus to said total volume, said ducts in said annuli being arranged so that the volume fraction in each annulus is progressively decreased directly proportionally to a square of a distance of the annulus from the central longitudinal axis from an outer annulus of ducts to an inner annulus of ducts thereby each duct is substantially uniformly heated by inductive heating provided that the volume of the ducts in each annulus does not exceed half the total volume of the annulus and each duct in each annulus is equidistantly spaced from said axis, to obtain an isothermal reaction zone,
   (b) heating means for heating said element by electromagnetic induction,
   (c) entry conveyance means for conveying fluid to be reacted to the entry side of the reactor, and
   (d) exit conveyance means for conveying fluid away from the exit side of the reactor.

2. The reactor of claim 1 wherein the reactor element is a plurality of solid blocks arranged in an end to end abutting relation with said ducts in alignment at each abutting face and abutting with exit face to entry face in a sealing engagement.

3. The reactor of claim 2 wherein an enclosed mixing chamber is provided between two blocks arranged in an end to end abutting relation by adapting the engagement between the blocks.

4. An inductively heatable reactor as claimed in claim 1 wherein:
   (a) the inductively heatable fluid permeable reactor element is from 20 cm to 400 cm in length and 10 to 200 cm in diameter comprising at least one solid block in which is provided 50 to 500 fluid-conveying ducts which are circular in cross-section and have a diameter in the range of 2 to 12 mm, said ducts extending along the reactor element in a substantially parallel arrangement in which substantially all of the ducts are arranged in at least one group thereby each duct in said at least one group is located in a region of the reactor element in which substantially uniform inductive heating is provided;
   (b) the heating means for heating the reactor element by electromagnetic induction heats the reactor element to a temperature in the range of 850° C. to 1150° C.;
   (c) the entry conveyance means conveys fluid to be reacted to the reactor element for passage therethrough, and
   (d) the exit conveyance means conveys exit fluid away form the reactor element; whereby the reactor element is capable of providing fluid residence times therein of less than 200 milliseconds.

5. An inductively heatable reactor as claimed in claim 1 wherein the reactor element is lagged with a layer of insulating material.

6. An inductively heatable reactor as claimed in claim 1 which further comprises a fluid impermeable reactor casing arranged around the reactor element to provide an enclosed chamber between said reactor casing and said reactor element.

7. An inductively heatable reactor as claimed in claim 5 wherein the layer of insulating material is covered with a thin layer of a metal.

8. An inductively heatable reactor as claimed in claim 6 wherein a second reactor casing of a non-conducting layer of insulating material is disposed around one of the reactor casing and the induction heating means.

* * * * *